(12) United States Patent
Kavipurapu

(10) Patent No.: US 9,984,037 B1
(45) Date of Patent: May 29, 2018

(54) SCHEDULER FOR A FINE GRAINED GRAPH PROCESSOR

(71) Applicant: SYNAPTIC ENGINES, LLC, Naperville, IL (US)

(72) Inventor: Gautam Kavipurapu, Germantown, TN (US)

(*) Notice: Subject to any disclaimer, the term of this patent is extended or adjusted under 35 U.S.C. 154(b) by 0 days. days.

(21) Appl. No.: 15/139,529

(22) Filed: Apr. 27, 2016

Related U.S. Application Data

(60) Provisional application No. 62/153,258, filed on Apr. 27, 2015.

(51) Int. Cl.
G06F 9/45 (2006.01)
G06F 15/80 (2006.01)
G06F 9/48 (2006.01)
G06F 13/28 (2006.01)

(52) U.S. Cl.
CPC .......... *G06F 15/80* (2013.01); *G06F 9/4881* (2013.01); *G06F 13/28* (2013.01)

(58) Field of Classification Search
USPC ........................................................ 717/161
See application file for complete search history.

(56) References Cited

U.S. PATENT DOCUMENTS

| | | |
|---|---|---|
| 4,982,439 A | 1/1991 | Castelaz, et al. |
| 5,465,056 A | 11/1995 | Hsieh et al. |
| 5,844,890 A | 12/1998 | Delp et al. |
| 5,893,120 A | 4/1999 | Nemes |
| 6,139,199 A | 10/2000 | Rodriguez |
| 6,278,978 B1 | 8/2001 | Andre et al. |
| 6,370,566 B2 | 4/2002 | Discolo et al. |
| 6,490,545 B1 | 12/2002 | Peng |
| 6,504,786 B1 | 1/2003 | Kavipurapu |

(Continued)

FOREIGN PATENT DOCUMENTS

| | | |
|---|---|---|
| CA | 2575869 | 3/2006 |
| EP | 2256622 | 9/2004 |
| WO | 2008072178 | 6/2008 |

OTHER PUBLICATIONS

An Algebra for Deriving Efficient Implementations for an Array Processor Parallel Computer from Functional Specifications, Technical Report 1995/Jun.SF.AS.MC.JMB, Stephen Fitzpatrick, A. Stewart, M. Clint, J. M. Boyle, Jun. 1995, The Queen's University of Belfast, Department of Computer Science, Belfast BT7 1NN, Northern Ireland.

(Continued)

*Primary Examiner* — Chameli Das
(74) *Attorney, Agent, or Firm* — Law Office of Konrad Sherinian, LLC

(57) ABSTRACT

A novel scheduler design is provided that schedules a set of operations to an array of similar or dissimilar, candidate operations on a cycle by cycle basis, out of a total number of operations. The array of similar or dissimilar units can be atomic in nature or ALU like or complete processors. The scheduler is able to map the operations in a data flow/sequencing graph to the two dimensional or 3 dimensional array (which can be extended to a multi-dimensional array) optimally so as to minimize the total execution times. The mapping is path based computation, where a particular sequence of instructions is routed through the underlying matrix in path that minimized the number of memory hops.

12 Claims, 13 Drawing Sheets

(56) References Cited

U.S. PATENT DOCUMENTS

| | | | |
|---|---|---|---|
| 6,901,070 | B2 | 5/2005 | Kavipurapu |
| 6,988,192 | B2 | 1/2006 | Snider |
| 7,219,342 | B2 | 5/2007 | Metzgen |
| 7,236,488 | B1 | 6/2007 | Kavipurapu |
| 7,401,206 | B2 | 7/2008 | Hetherington et al. |
| 7,406,573 | B2 | 7/2008 | Huppenthal et al. |
| 7,617,495 | B2 | 11/2009 | Muthukumar et al. |
| 9,047,124 | B2 | 6/2015 | Mehta et al. |
| 2004/0088685 | A1 | 5/2004 | Poznanovic |
| 2007/0198971 | A1* | 8/2007 | Dasu ................ G06F 8/433 717/140 |
| 2007/0294680 | A1* | 12/2007 | Papakipos ............ G06F 8/456 717/149 |
| 2009/0172351 | A1 | 7/2009 | Vorbach |
| 2010/0094828 | A1* | 4/2010 | Mehta ................ G06F 9/5027 707/705 |
| 2012/0324454 | A1* | 12/2012 | Gounares ........... G06F 9/44521 718/100 |
| 2013/0191843 | A1* | 7/2013 | Sarkar ................ G06F 9/505 718/105 |
| 2013/0290974 | A1* | 10/2013 | Druyan ............... G06F 9/5038 718/103 |
| 2017/0371703 | A1* | 12/2017 | Wagner .............. G06F 9/4881 |

OTHER PUBLICATIONS

PACT, XPP Technologies, XPP-III Processor Overview, White Paper, Version 2.0.1, Jul. 13, 2006, support@pactxpp.com.

A Coarse-Grain FPGA Overlay for Executing Data Flow Graphs, Davor Capalija and Tarek S. Abdelrahman, Workshop on the Intersections of Computer Architecture and Reconfigurable.

Turning Java into Hardware: Caffinated Compiler Construction, C. Scott Ananian, 1998, Revision 1.11.

A Coarse-Grain FPGA Overlay for Executing Data Flow Graphs, Davor Capalija and Tarek S. Abdelrahman, Workshop on the Intersections of Computer Architecture and Reconfigurable Logic (CARL 2012): Category 2.

A Coarse-Grain FPGA Overlay for Executing Data Flow Graphs, Davor Capalija and Tarek Abdelrahman, University of Toronto, CARL 2012.

Tiny Tera: A Packet Switch Core, Nick McKeown, et al., Jan.-Feb. 1997 edition of IEEE Micro.

U.S. Appl. No. 13/783,209, "Reconfigurable Graph Processor", filed Mar. 1, 2013, Gautam Kavipurapu.

U.S. Appl. No. 15/137,175, "Reconfigurable Graph Processor", filed Apr. 25, 2016, Gautam Kavipurapu.

* cited by examiner

| Atomic Operation | Operand 1 | Operand 2 | Result | Overflow |
|---|---|---|---|---|
| Add | yes | yes | yes | no |
| Subtract | yes | yes | yes | no |
| Multiply | yes | yes | yes | yes |
| Divide | yes | yes | yes | yes |
| Shift | yes | no | yes | Yes (depends) |
| Boolean | yes | Yes (depends) | yes | no |
| Square Root | yes | no | yes | Yes (depends) |
| Invert | yes | no | yes | Yes (depends) |
| Absolute | yes | no | yes | no |
| Complex Multiply | yes | no | yes | Yes (depends) |
| Logarithm | yes | no | yes | no |
| Comparator | yes | yes | yes | no |

Entry associated with one resource in the graph processor Scoreboard (1102)

| Field | Value | Description |
|---|---|---|
| RESOURCE K VALUE | 1 | INDICATES RESOURCE TYPE — ADDER SINCE K=1 |
| $I_K$ VALUE | 10 | 10th RESOURCE OF TYPE K=1 |
| TIME | 20 | CURRENT CLOCK CYCLE |
| SCHEDULED_OPS | 1 | TYPE OF OPS SCHEDULED (FLAG) → 0=NO 1=YES |
| X | 1 | X CO-ORDINATE |
| Y | 2 | Y CO-ORDINATE |
| Z | 10 | PLANAR MATRIX NUMBER |

FIG. 11B

Graph Processor Scoreboard (1104)

| | | | | | | | | | |
|---|---|---|---|---|---|---|---|---|---|
| RESOURCE K VALUE | 1 |   |   |   | 2 | ooo |   |   | N |
| RESOURCE $i_k$ VALUE | 1 | 2 | 3 | 4 | 1 | ooo | 1 | 2 | 3 |
| TIME (CURRENT CYCLE) | 0 | 0 | 0 | 0 | 0 | ooo | 0 | 0 | 0 |
| SCHEDULED_OPS | 0 | 0 | 0 | 0 | 0 | ooo | 0 | 0 | 0 |
| X – CO-ORDINATE | 1 | 10 | 12 | 50 | 9 | ooo | 0 | 5 | 4 |
| Y – CO-ORDINATE | 20 | 14 | 5 | 10 | 18 | ooo | 55 | 28 | 32 |
| Z – CO-ORDINATE | 1 | 5 | 10 | 1 | 4 | ooo | 1 | 2 | 2 |

Internal Representation of the sequencing Graph used by the scheduler Control block

SCHEDULER FOR A FINE GRAINED GRAPH PROCESSOR

CROSS-REFERENCE TO RELATED APPLICATIONS

This application claims the benefit and priority of U.S. Patent Application No. 62/153,258, entitled "A SCHEDULER FOR A FINE GRAINED GRAPH PROCESSOR," filed Apr. 27, 2015, which is hereby incorporated by reference in its entirety. This application is related to U.S. patent application Ser. No. 13/783,209, titled "RECONFIGURABLE GRAPH PROCESSOR," filed Mar. 1, 2013, assigned to Synaptic Engines, LLC of Naperville, Ill., and which is hereby incorporated by reference.

FIELD OF THE DISCLOSURE

The present invention generally relates to parallel processing engines, and more particularly relates to scheduling of operations between multiple parallel execution units in a graph processor or multi-core processor.

DESCRIPTION OF BACKGROUND

In microprocessor based systems (or systems or machines for short), tasks are typically defined by a set (meaning one or more) of high level instructions written in a suitable high level programming language, such as C, C++, Fortran, Basic and JAVA computer programming languages. The strength of high level languages lies in their flexibility allowing the programmers to write programs or code in their own style. The operating systems (such as Unix, Linux and Windows) running in the microprocessor based systems controls the breakdown of the high level instructions into lower level instructions ("native code" or "byte code") which are executed by the microprocessors. The operating systems also arbitrate cases where contention for the various resources of the systems occurs.

Compilers normally convert (i.e., compile) high level instructions into lower level instructions executable by microprocessors. Compilers are well known art to persons of ordinary skills in the art. The basic components of a compiler are further illustrated by reference to FIG. 1. Referring now to FIG. 1, a language dependent front end 102 of a compiler 100 usually contains a lexical parser, which understands the grammar pertaining to the underlying high level computer programming language. The lexical parser converts high level instructions into logical constructs. At a second stage of the conversion from high level instructions to low level instructions, an optimizer 104 performs loop optimizations, unrolling, etc. At a third stage, a different optimizer 106 performs memory optimizations and management. After the third stage of the conversion, a code generator 108 generates the byte code to be run by a microprocessor.

The scheduling and binding operations of the compiler 100 typically encompass the third and fourth stages, corresponding to the optimizer 106 and the code generator 108. The optimizer 106 and the code generator 108 can be partitioned into hardware and software, depending on a given design. Typically, in systems requiring static code generation, all compiler components are implemented in software, while in systems requiring dynamic code generation, some of the compiler components may be implemented in hardware such as schedulers and binders that take instructions and associate them with actual hardware that will execute those instructions. It should be recognized that implementing components of the compiler 100 in hardware reduces system flexibility and the re-programmability of the machine using a high level language as evidenced in the current art.

One of the components of the compiler 100 is the scheduler which schedules, at compile time, the tasks called for in the code for execution by the target hardware. The scheduling also includes implementing memory management functions such as controlling the use of global and local registers, and the utilization of different levels in memory hierarchy. Typically, tasks are scheduled through the ordering of instructions in a sequence and the insertion of memory references. Normally, the scheduling is static, meaning that once the ordering of instructions cannot be changed once it is set at compilation time.

Another important function of the scheduler is binding. Binding is generally the process of optimizing code execution by associating different properties to a sequence of instructions. For example, in resource binding, a sequence of operations is mapped to the resources required for their execution. If several instructions map to the same hardware for execution, the scheduler, under the resource binding protocol, distributes the execution of the set of instructions by resources based on a given set of constraints to optimize performance. In some instances binding and scheduling are viewed as two separate tasks.

Generally most of the scheduling problems are modeled as ILP (Integer Linear Programming) problems, where the schedule of the required sequence of instructions is decided based on a set of simultaneous linear equations. The scheduler works on the data flow graph ("DFG") or control flow graph ("CFG") that is generated in the previous stages of the compilation process. The common types of schedulers in use today are round robin, first in first out, shortest job first, multi-level queue scheduling, priority based scheduling, etc. A highly optimized multi-level priority based scheduler was implemented for a system that is fully set forth in U.S. Pat. No. 7,236,488 which is hereby incorporated by reference.

OBJECTS OF THE DISCLOSED SYSTEM, METHOD, AND APPARATUS

Other advantages of this disclosure will be clear to a person of ordinary skill in the art. It should be understood, however, that a system, method, or apparatus could practice the disclosure while not achieving all of the enumerated advantages, and that the protected disclosure is defined by the claims.

SUMMARY OF THE DISCLOSURE

Generally speaking, pursuant to the various embodiments, the present disclosure provides a general-purpose scheduler for executing a task that contains a set of instructions that are distributed to several execution units. These units can be of the same type or of dissimilar type. The units may also have the property where they are designed to execute only one kind of instruction that is a subset of the set of instructions for the entire task or can execute multiple instructions a set of which forms subset of set of instructions of the entire task.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views. Elements in the drawings are not necessarily drawn to scale. Additionally, the detailed description and drawings do not necessarily require the order the elements are illustrated. Moreover, for simplicity and clarity of illustration, common and well-understood elements to those skilled in the art may not be depicted for simplicity and clarity of illustration.

FIG. 2 illustrates an set of atomic operations in accordance with this disclosure;

FIG. 11A is a scoreboard structure in accordance with this disclosure;

FIG. 11B is a scoreboard entry structure in accordance with this disclosure;

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION OF THE ILLUSTRATED EMBODIMENT

Every computer instruction (or instruction for short) can be broken down into a set of atomic operations, a sample set of which is shown at 202 in FIG. 2. Atomic operations include, without limitation to, addition, multiplication, division, subtraction, shifting and Boolean operations. Shifting enables one to perform pointer arithmetic as well as to generate offsets and addresses from a given base address. Boolean instructions are generally used to implement operations, for example, logical AND, OR, NOT, NOR, NAND, XOR,)(NOR. Some of the Boolean instructions are compound instructions that are combinations of other simple Boolean instructions. Any high level instruction can be formed by combining a set of atomic operations (also interchangeably referred to herein as atomic instructions) together. A simple high level instruction is typically translatable into one atomic instruction, A compound or complex high level instruction is translatable into a combination of multiple atomic instructions.

An atomic operation usually operates on one or more operands, such as operands 204 and 206, and generates a result 208. For example, some Boolean atomic operations, such as the multi-input NAND GATE, GATE, XOR AND NOR operations, operate on more than one operand. It should be noted that the list of atomic operations 202 is not comprehensive, and can be made more exhaustive with the addition of operations, for example, such as a right circular shift and a left circular shift. As an additional example, the atomic operations 202 include trigonometric operations, such as cosine, sine, tangent, complex addition and subtraction, and natural logarithm. All instructions consist of Atomic Operations 202 which, along with Simple Instructions, are defined as those operating on two or more operands with a single operator.

Figure 1:
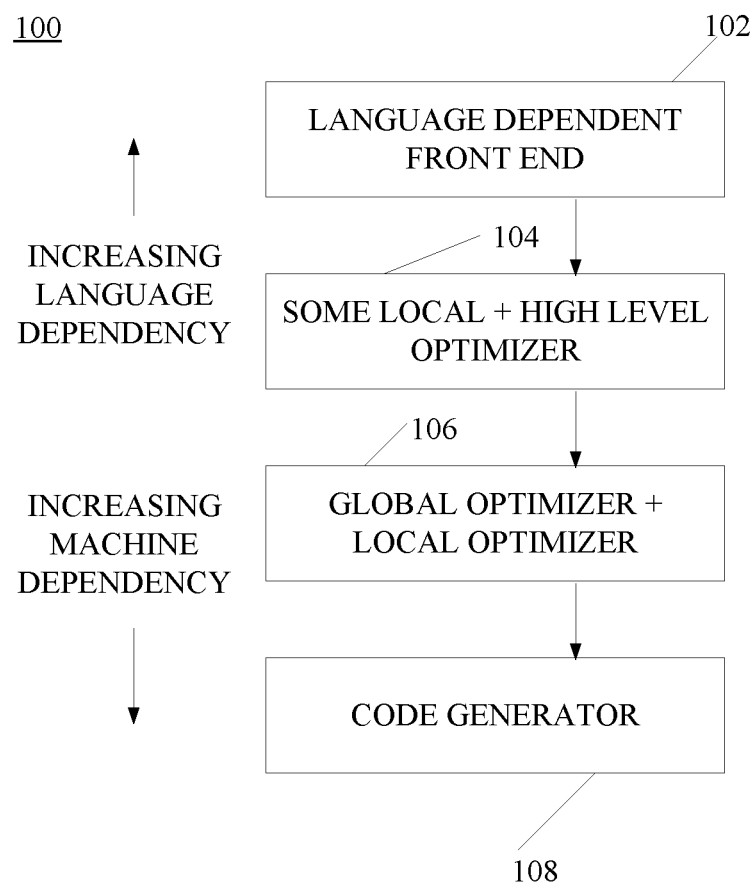
FIG. 1 is a simplified block diagram of a compiler in accordance with this disclosure.
Figure 3:
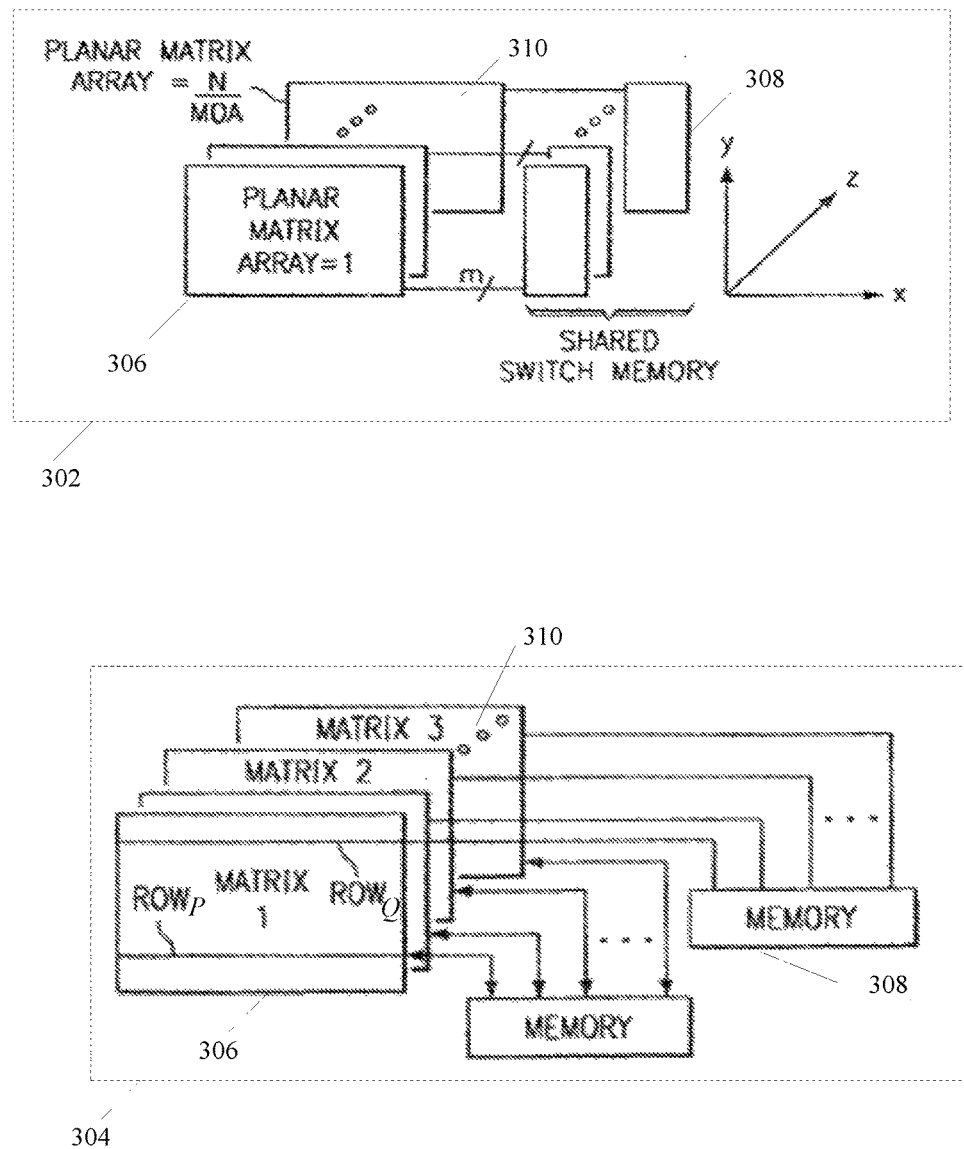
FIG. 3 illustrates two block diagrams depicting the architecture of two fine grained graph processors in accordance with this disclosure.

In a fine grained graph processor based system, each atomic operation 202 is performed by an atomic execution unit. Two illustrative graph processors 302 and 304 in FIG. 3 are more fully set forth in U.S. application Ser. No. 13/783,209, which was previously incorporated by reference. Referring now to FIG. 3, two block diagrams depicting the architecture of fine-grained graph processors 302 and 304 are shown. The processors 302 and 304 each include a set of banks (also referred to herein as planes) 306 and a shared switch memory 308. Switch memories are also referred to herein as switched memories and bank switched memories. Each bank 306 includes a set of planes 310.

A planar graph processor, or one bank of a graph processor 310 is further illustrated by reference to FIG. 4, The plane 310 is organized as m of rows and n columns of execution resources (also referred to herein as resources and processing resources) 402. The resources 402 of different planes 310 form an interconnection matrix 306 of the processor 302. Each resource 402 is a node of the interconnect matrix 306 of the processor 302. Execution resources are analogous to, but not limited to, atomic execution units. As used herein, the resources 402 are also referred to atomic execution units. Execution resources include, without limitation to, any Broadcast Switch Elements ("BSEs"), Receive Switch Elements ("RSEs"), memory elements and interconnect elements. The total number of atomic execution units in a plane 310 is m*n. Each atomic execution unit 402 is capable of executing one of the atomic operations 202. Each atomic operation 202 executed by the atomic execution unit 402 has one or more operands 204,206 as input and one or more results 208 as output.

In typical computation problems, each the atomic execution unit operates on two operands 204,206 and generates one result 208. Let N denote the total number of atomic execution units of the processor 302. Accordingly, the number of banks/planes in the processor 302 is N/(m*m). Where m is the number of rows of atomic execution units per bank and n is the number of columns of atomic execution units per bank. In the illustrative embodiment, the processors 302 and 304 each have a cubic configuration of atomic execution units. Alternatively, different configurations can be implemented in accordance with the present teachings.

Each execution resource 402 is considered as a resource (r) for executing a particular type of atomic operation 202. Each resource belongs to a set of resources (R) containing distinct types of resources. The counts of recourses is described by the formula below:

$$\Sigma i_k = N$$

where $i_k$ stands for the number of resources of resource type k. For example, in the illustrative FIG. 2, where k=1, the resource type is an adder, while the resource type is a comparator when k=12. Each resource of type k is then denoted by $r_j i_k$. For example, where k=1 (meaning adders) and there are two resource of type k, then the two resources are represented as $r_1 i_1$ and $r_2 i_1$. As an additional example, where type of resource is dividers, k=4, and there are 3 dividers in the resource R, then the three dividers are represented as $r_1 i_4$, $r_2 i_4$ and $r_3 i_4$. Accordingly, the resource set R can be expressed as:

$$r \in R: R = \{r_1(i_1), r_2(i_1), r_3(i_2), r_4(i_3), \ldots, r_R(i_k)\}$$

Figure 4:
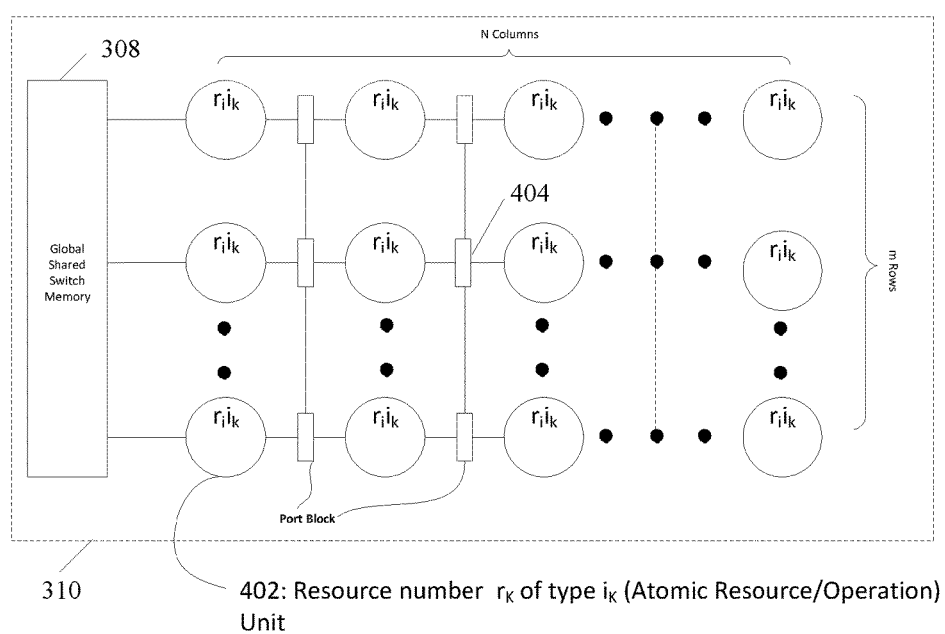
FIG. 4 is a block diagram depicting the architecture of a graph processor in accordance with this disclosure.

As shown in FIG. 4, each resource is denoted as $r_i i_k$, where different resources have different resource number $r_i$ or resource type number k. A physical interconnect exists between any two resources $r_i i_k$ that belong to the set R. Each resource $r_i i_k$ has a co-ordinate in the Cartesian space (x, y, z), where the co-ordinate x indicates the row number, the co-ordinate y indicates the column number and the co-ordinate z indicates the plane number of the resource $r_i i_k$. In the illustrative processor 302, the number of planes is denoted by P. For a two dimensional or planar structure of the fine grained processor 302, a resource or its corresponding atomic execution unit is designated as $r_i i_k(x, y)$. Similarly, a resource in a three dimensional structure of the fine grained processor 302 is designated as $r_i i_k(x, y, z)$.

The structure of the fine grained graph processor 302 is illustrated in a Cartesian space. However, it can be implemented in different configurations, limited only by the physical interconnect topology. The interconnect topology is defined by factors, for example, such as cost, maturity of the technology, size and similar design considerations. In practical applications, the interconnect technology can be designed to optimally implement the set of instructions for a given task in a particular target application space. In one implementation, the atomic execution units 402 form the nodes of a fully connected graph and the traversal from one node of the graph to the other takes equal time and effort, i.e., the cost in terms of distance and other factors.

In digital logic or analog devices, different types of instructions require different amounts of time to execute. Such disparity is caused by, among other factors, the need to reduce an instruction to different types of binary arithmetic operations, and perform these arithmetic operations using corresponding resources available on the underlying device. For example, multiplication and division operations take longer to execute than addition and subtraction operations because a multiplication requires a series of successive additions and a division requires a series of successive subtractions in a standard binary circuitry.

The time to execute instructions in a given data flow graph affects the cost function of traversing the 2-dimensional or 3-dimensional interconnect matrix 306 of the fine grained graph processor 302. An execution path along a set of nodes passes through execution resources 402 that perform different atomic operations with different execution time. Consequently, the selection of a processing (or execution) path through the 2-dimensional or 3-dimensional matrix 306 of resources 402 is critical to efficient operation of the processor 302. This execution time dependency on instruction type necessitates the presence of storage elements for temporarily holding the intermediate results generated by the execution of the sequences of instructions within an execution path. The storage elements then help to avoid stalling, a problem commonly experienced in pipelined processors.

Generally, the fine grained parallel processor 302 executes simple and compound (or complex) instructions. As used herein, simple and compound instructions are high level computer programming language instructions. An exemplary simple instruction is a basic addition operation: A+B. An exemplary compound instruction is a combination of one addition and one multiplication operation: (A+B) C. A set of simple and/or compound instructions comprise a task. The instructions of the task can be scheduled for execution by available resources of the processor 302.

Scheduling operations for the processor 302 involves minimization of execution time of a set of instructions with three basic constraints: (1) Resource constraints; (2) Timing constraints; and (3) Path constraints. Resource constraint is the limitation of the number of resources of a certain type that are available to execute instructions. For example, the number of atomic execution units 402 of a specific type that are available is a resource constraint. Timing constraint is the limitation of time when a particular instruction needs to be completed, and how long the atomic execution units 402 take to execute the instruction. Path constraint is the cost associated with the execution path's traversing through the processor 302. The determination of the execution path depends on the execution time for each instruction; and the number of memory or storage elements. The memory or storage elements can serve as registers for the machine. In addition, the memory or storage elements can function as the cache (or extension of a monolithic cache) that the execution path has to pass through.

One of the key benefits of having these registers built using RSEs and/or BSEs contained in port blocks is that it reduces data movement, memory write-backs and subsequent reads from memory of lower levels for the next set of computations. By using RSEs and/or BSEs in port blocks; data is present in the interconnection matrix 306 when the next set of computations is carried out. Another benefit amongst many is that it saves and negates the need for an additional write or store instruction that is used in traditional processor architectures.

These storage and memory elements are in the form of port blocks (also referred to herein as port block registers) 404 and the global shared switch memory 308, each of which has the same or different traversing cost. The storage elements are built using port blocks 404, which interconnect the planes 310 and the atomic execution units 402. The port blocks 404 are more fully set forth in U.S. application Ser. No. 13/783,209, which was previous incorporated by reference, and U.S. Pat. No. 6,504,786 which is hereby incorporated by reference.

Figure 6:
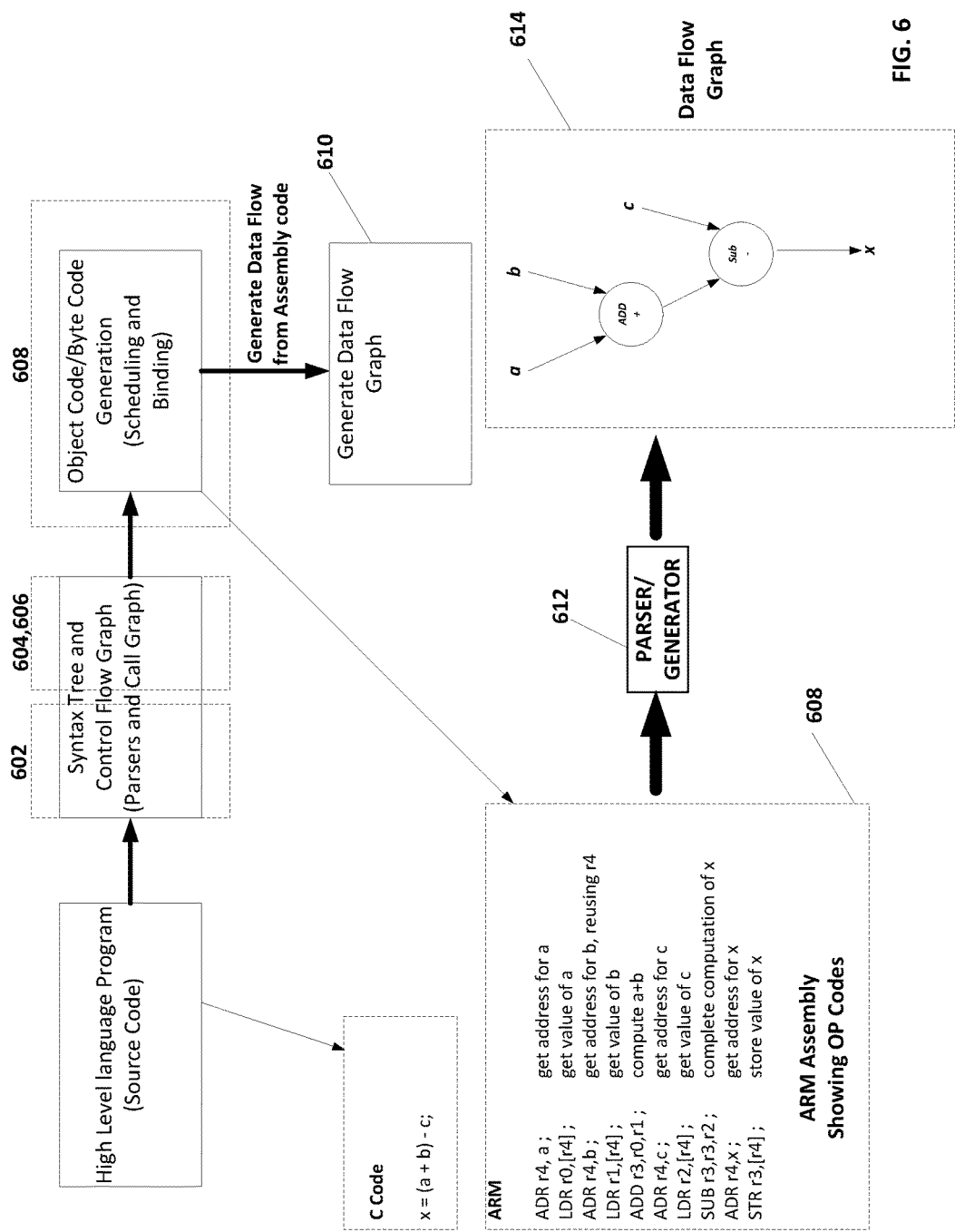
FIG. 6 is an unscheduled sequencing graph illustrating the interdependency of the execution of instructions in accordance with this disclosure.

Referring to FIG. 6, computer programs written in a high level language, such as C, C++, Fortran, Basic or Pascal, is translated into assembly code (or op-code, byte code, object code) by a compiler. The translation happens at 602, 604, 606, 608. At 610, the assembly language code is then translated into a data flow graph 614 using a post-processor 612. The post-processor 612 constructs the data flow graph 614 for the entire program or for the particular window of the program. In this illustration, the assembly code is ARM processor based op-code. It should be noted that the illustration of FIG. 6 is also application to the x86 and MIPS family of processors. When the byte code is generated, loop unrolling and other memory optimizations are performed at the stages 602,604,606 of the compiler.

Where the processor 302 is implemented as a co-processor to another processor, such as an ARM processor, ARM processor can directly fetch all data associated with the addresses of a, b and c, preload the data into a cache, and wait for a scheduler to schedule the execution of segment of byte code. As shown in FIG. 6, for each addition, a register is needed to store the intermediate result of the addition operation. A register is also needed to store the operands a, b and c. In one implementation, a, b and c are fetched up front to save time in the data fetching. They are then stored in the switched memory 308 ready to be issued. The scheduler schedules the operation to adders available at the given time in the matrix 306. In such a case, the time to load the values of a, b and c into registers is then a saved time.

In the illustrative implementation, a single register r4 is used to store the address values due to structural limitations of register availability. Therefore, every time a new address associated with a new variable is required, r4 need to be free and available. In such a case, a total of six instructions are required to load the values of a, b and c. Additionally, a single register r3 is used to store the results of (a+b) and (a+b)−c.

In one embodiment in accordance with the present teachings, only one instruction is required since all the values of a, b and c are loaded in parallel into the switch memory 308, where sufficient number of registers are available for storing the values of all three variables. Moreover, two different adders can be used to store (a+b) in one port block structure and (a+b)−c in another port block structure if the adder is available after freeing up the previous register. Another advantage is the commutative nature of the operation, x=(a b)−c, can be exploited when execution resources 402 are available in any given cycle. In such a case, a+(b−c) is executed. In other words, (b−c) is performed first where no adders are available. Accordingly, where the same atomic operation unit is used to perform the instruction, the availability of data in the port block register emulates register forwarding to allow the execution of the instruction reusing the same atomic operation unit.

In performing the compound instruction x=(a+b)−c in the way described above, the time that is equal to six instruction time (meaning getting an address and loading an register with a value). An additional improvement can be made by replacing three loads with one. For example, before the instruction (a+b)−c is executed, the variables a, b and c can be loaded into the switched memory 308 or port-block registers 404 in the matrix 306. In this example, two instruction time is saved and three address lookups are eliminated. Accordingly, the execution time (in terms of clock cycles) of an operation or task is then half of the execution time of the same operation or task by a traditional processor. Computer programs usually include thousands and millions of instructions. The cumulative speedup is thus substantial.

The instructions that require moves of data using loads and stores because of previous write-backs are sped up. Instructions that have to wait due to resource constraints/conflicts are also sped up. Furthermore, the instructions without dependencies can be executed anytime with the availability of more resources, such as atomic units and registers. Accordingly, the architecture of the processors 302 and 304 reduces structural and resource hazards, and enables more efficient scheduling and speedup of instructions.

A compiler performs local and global optimizations on a set of high-level language instructions, which are parsed and then further reduced to a set of instructions necessary to perform the required task. For example, the pseudocode fragment below could be programmed in C++ or a different high level language.

If (a<b)
{

*X*=4;

*Y*=*c*+*d*;

}
Else

Figure 7:
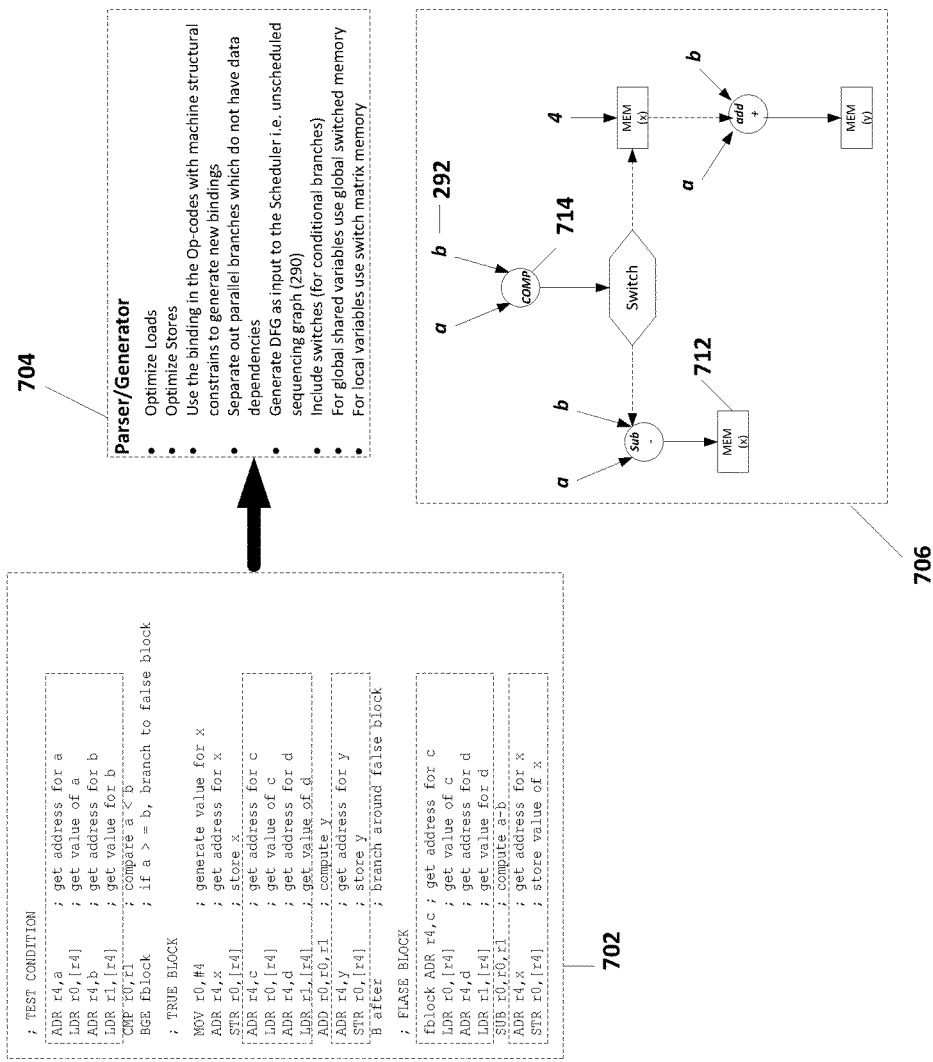
FIG. 7 is diagram illustrating a process of parsing instructions in accordance with this disclosure.

*X*=*c*−*d*;

After this snippet of code goes through the different stages of the compiler, a set of machine language instructions (meaning assembly code, byte code or op-code) is produced. The machine language instructions are executed by the execution resources 402 in the fine grained graph processor 302. The op-code produced for an ARM processor is listed below and shown at 702 in FIG. 7.

; TEST CONDITION
ADR r4,a ; get address for a
LDR r0,[r4] ; get value of a
ADR r4,b ; get address for b
LDR r1,[r4] ; get value for b
CMP r0,r1 ; compare a<b
BGE fblock ; if a>=b, branch to false block
; TRUE BLOCK
MOV r0,#4 ; generate value for x
ADR r4,x ; get address for x
STR r0,[r4] ; store x
ADR r4,c ; get address for c
LDR r0,[r4] ; get value of c
ADR r4,d ; get address for d
LDR r1,[r4] ; get value of d
ADD r0,r0,r1 ; compute y (c+d)
ADR r4,y ; get address for y
STR r0,[r4] ; store y
B after ; branch around false block
; FALSE BLOCK
fblock ADR r4,c get ; address for c
LDR r0,[r4] ; get value of c
ADR r4,d ; get address for d
LDR r1,[r4] ; get value for d
SUB r0,r0,r1 ; compute c-d
ADR r4,x ; get address for x
STR r0,[r4] ; store value of x The op-code 702 includes binding. Binding means that the compiler optimizes the use of resources and ties each instruction to a physical resource available on the processor machine on which the code is being executed. It should be noted that a different snippet of code will be generated by a different compiler. Additionally, the generation of the op-code also depends on the target processor on which the op-code is to be executed. The op-code 702 is then fed into a parser (also referred to herein as generator) 612 to generate a data flow graph 614, which is then scheduled by a scheduler for execution on the processor 302.

The data flow graph 614 is an unscheduled sequencing graph ("SG"). To generate the graph 614, each register (such as r0 and r4) in the op-code 702 is replaced by a store location or memory 712. The store location or memory 712 in the fine grained processor 302 corresponds to a port block register 404. Based on the execution path of the graph 614 and the requirement of storage nodes by graph 614, the store location or memory 712 may also be a location within the global switched memory 308. The generation of the graph 614 further includes consolidating data loading (or load). If the fine grained processor 302 is present busy or used, data is then loaded into a cache. For static loading of data associated with variables that are not calculated as a result of a previous step, the data is statically loaded from a memory location. The same data can also be loaded into the switched memory 308 or the port blocks 404. Accordingly, the data is preloaded into the appropriate memory location in the global switched memory 308 or port blocks 404 before execution starts.

In the fine grained processor 302, a memory write back is equivalent to moving or writing back the data to the global switched memory 308 to make it available globally. The data in the port block registers 404 in the matrix 306 is also available globally. However, the cost of traversal across rows, then columns and eventually banks in the matrix 306 is higher than directly being routed from the global switched memory 308. Since all memory is visible to all atomic execution units 402, write back is logically equivalent to leaving the data in place. In other words, the data in the corresponding port block 404 in the matrix 306 is not left without being written to a different place. Accordingly, write back on the processor 302 saves a step corresponding to an instruction in the op-code. The data that is written back is then used in the next scheduling cycle to be routed to the appropriate execution resource.

Leaving data in place is useful when a scheduling window is used to dynamically execute instructions on the fine grained processor or graph processor 302. For example, leaving data in place allows for use of the data by the next set of instructions outside of the current scheduling window that will be executed by the graph processor 302. The current scheduling window includes a section of the underlying data flow graph. In a further implementation, when the entire schedule, data flow graph or sequencing graph is statically generated for an entire task, intermediate data is also left in place in the matrix 306.

The parser 612 performs a number of functions, such as
Optimize loads (perform them in parallel where possible);
Optimize stores (perform them in parallel where possible);
Replace the binding in the traditional processor of resources to those that exist in the graph processor 302, such as replacing registers with memories 712 and op-codes with instructions/execution unit values 714 (such as addition, multiplication, compare, etc.);
Add in instructions such as switches (which might not be physically present as the memories in the system are switched memories) for the scheduler. Since there are no resource constraints and there are no data dependencies usually in switches they can be executed in parallel in the fine grained machine or graph processor 302. A switch is introduced when a conditional execution is required. Typically a switch would involve storing the result of the previous instruction in the global switched memory or cache 308;
For global variables, bind them to the global shared memory or switched memory/cache 308;
For local variables that are going to be left in place in the execution context of a thread or a sequence of instructions in the matrix, associate them with port block (BSE and RSE) memories 404.

The data flow graph or sequencing graph 614 typically indicates the data dependencies amongst the instructions. The output of the process of going through and generating the sequencing graph fills out a data structure that forms the node of a graph and the linked list or array of such structures will form the complete graph. An illustrative data structure is shown below:

Struct Node {
int: predecessor 1;
int: predecessor 2;
int: predecessor 3;
int: predecessor 4;
int: predecessor 5;
int: predecessor 6;
int: operator;
int: label;
int: successor 1;
int: successor 2;
int: successor 3;
int: successor 4;
int: successor 5;
} operation, switch/memory The number of predecessors and successors in a node of a graph is dependent on the fan in and fan out capability of the port blocks 404 and the RSE and BSE within the port blocks 404. Additionally, the number of predecessors and successors of the node can be optimized based on the source code of the underlying computer program. The optimization can be performed by profiling the computer program written in a high level computer programming language (such as C, C++, eta). The profiling generates statistics on the number and types of instructions (meaning op-codes, such as load, store, read, write, add, etc.) that are used for a set of lines of source code.

From the statistics, an accurate number of required registers, loads and stores can be derived. Usually computer programs are compiled using a compiler for a specific target, such as an ARM processor or a DSP processor. The instructions or op codes are then mapped to atomic operations. The entire graph then can be represented as a linked list where the values of the predecessors and successor are pointers to the structures that describe those nodes. The label field is a quality of service ("QoS") or constraint parameter. Furthermore, the label field is the distance between the node, which can be a memory register 712 or operator 714 and the NOP or the end of the flow graph.

Figure 9:
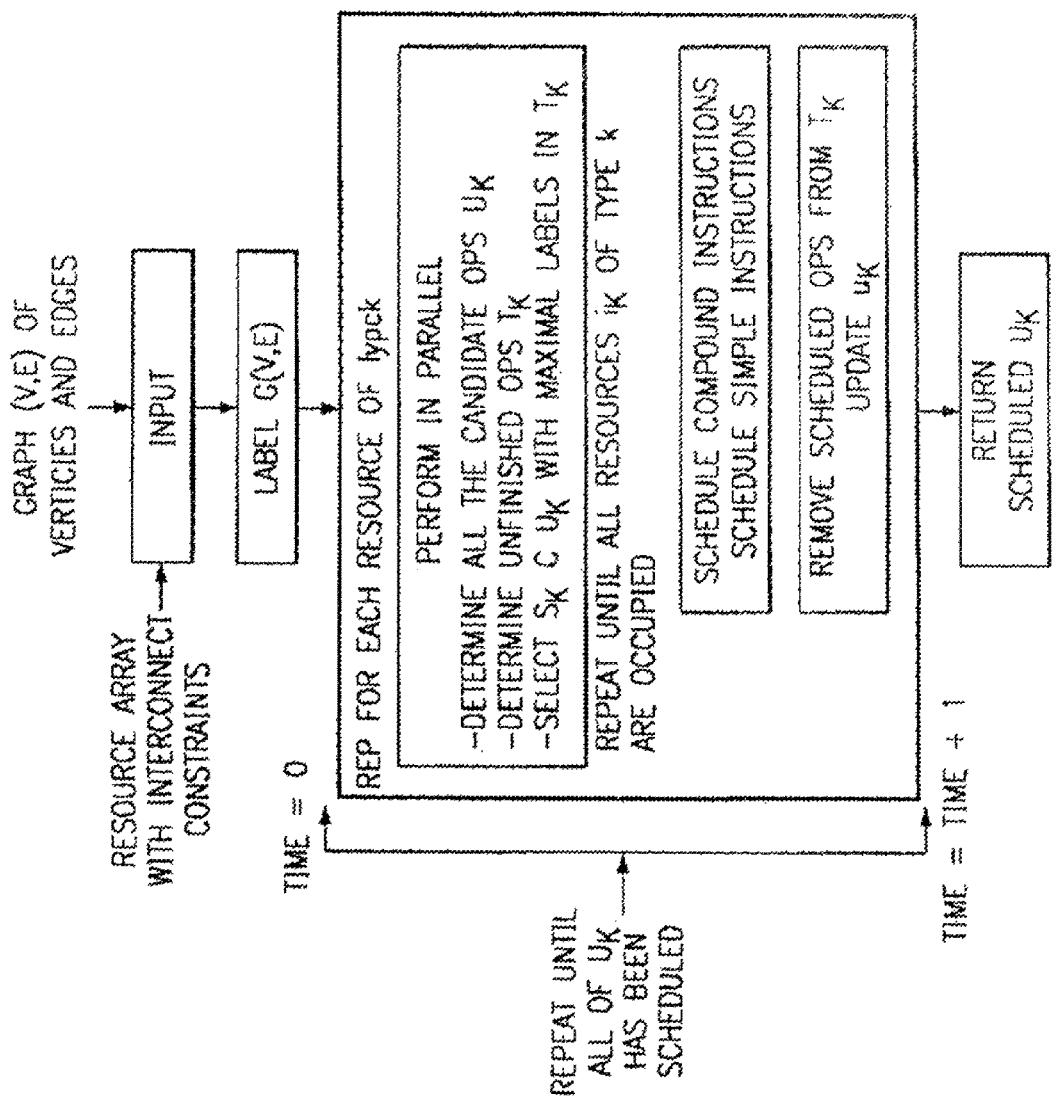
FIG. 9 is a block diagram depicting a scheduling algorithm for a scheduler in accordance with this disclosure.
Figure 10:
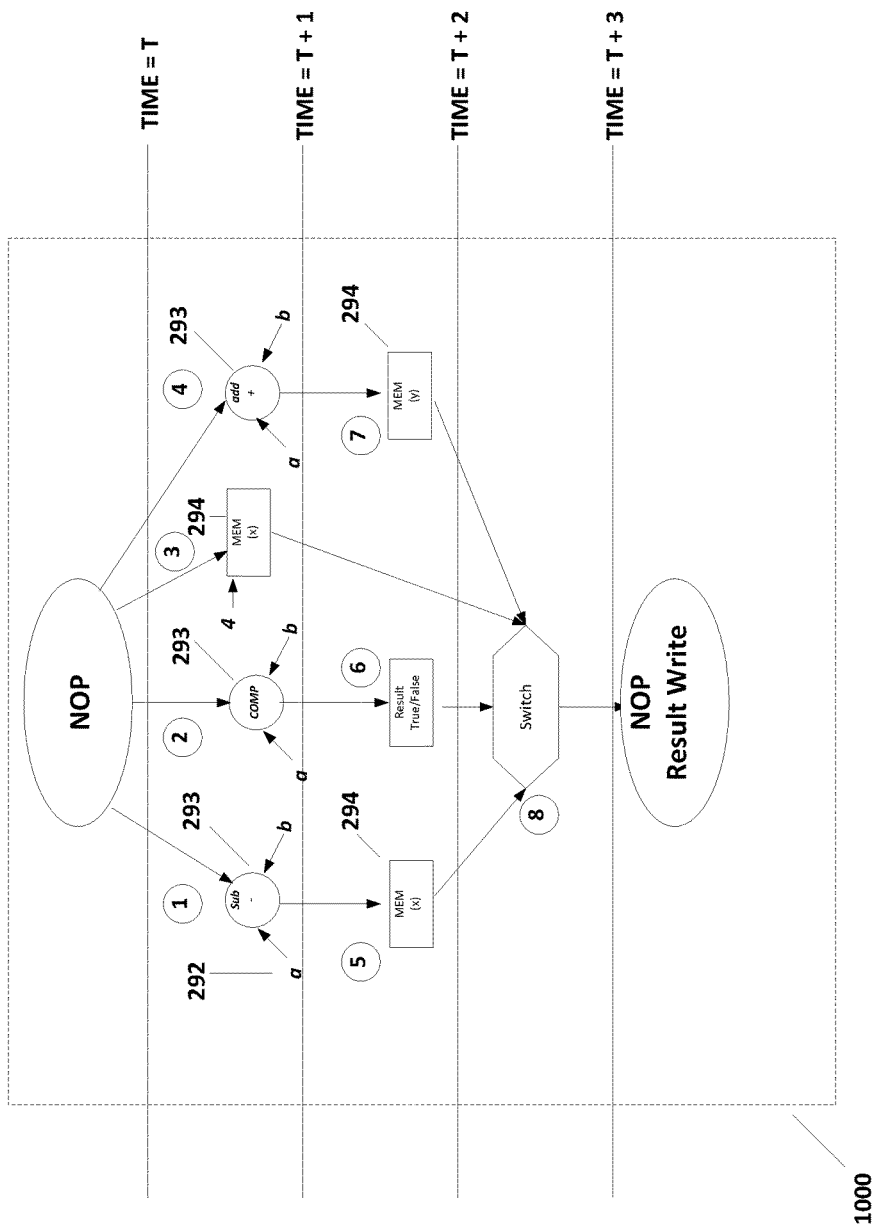
FIG. 10 is a sequencing graph in accordance with this disclosure.

Ideally, nodes that are farthest from the ending NOP should be scheduled first to finish the task associated with the graph. Additionally, it is desirable that all nodes that have the same label (indicating a priority) are scheduled together in the same time slot, as shown in FIG. 10. As shown in FIG. 9, to reduce the overall execution time of a snippet of code, the nodes of a label Y are scheduled as quickly as possible when the nodes of a label X are being executed in a time slot. Here, the nodes of label Y are scheduled immediately after the nodes of label X in the linked list.

FIG. 10 shows the output of the scheduler 800. The output 1000 is the scheduled sequencing graph 614. It is desirable to reduce the number of time slots or steps to execute the set of instructions of the graph 614 within the constraints on the number of execution resources available. It is further desirable to reduce the cost of traversing a particular execution path through the matrix of resources 402.

It should be noted that the parsing characteristics of the compiler also affects the manner in which instructions are executed on the processor 302. For example, the compound instruction, (a+b) c, can be executed based on the parenthesis rule such that the addition instruction (a+b) is executed first followed by the execution of a multiplication. On the other hand, the computations a*c and b*c can be independently performed first followed by the addition of the two multiplication results. The critical tradeoff in selecting one approach over the other is the time to execute each atomic operation and the resources available for executing the same.

A multiplication instruction typically takes longer to execute than an addition instruction. It is thus preferable to perform one multiplication and one addition rather than two multiplications and one addition. The reduction in execution time is obtained from the execution of two atomic operations rather than three atomic operations, and by minimizing the number of longer latency multiplication operations from two to one. MAC (Multiply Accumulate) instructions are used in most signal processing computations. Accordingly, a MAC instruction can be implemented, in the graph processor 302 or 304, using two multiplication atomic units and one adder atomic unit. For a more DSP (Digital Signal Processing) centric computer program, a custom matrix can be generated either by creating more atomic adders and multipliers in the matrix 310, or by adding atomic MAC operations.

In conventional CISC or RISC architectures, the number of resources available for the execution of a given set of instructions is limited. Consequently, additional local and global registers are required for storing intermediate results until the processing resources are free to perform the next instruction(s). Typically, in a pipelined architecture, these additional registers are inserted between processing stages. Additionally, the operation of these additional registers is appropriately timed to insure that operands are properly processed for the correct sequence of instructions. Instructions are typically processed along a serial execution path or pipeline.

In contrast, in the graph processor 302, each execution unit 402 only executes one atomic operation or instruction. For example, the execution of the compound instruction (a+b)*c requires the participation of a resource 402 implementing a multiplier and two resources implementing adders interconnected by a register or port block 404. Accordingly, the performance of the processor 306 depends on the number of clock cycles required to perform the instructions of a data flow or sequencing graph. Another factor affecting the performance of the processor 302 is efficient utilization of all the available resources 402 in the matrix 306. Execution time management on the processor 302 is thus a two variable optimization problem, namely, optimization of the time to execute a sequence of instructions and utilization of resources by exploiting the Instruction Level Parallelism ("ILP"). ILP is inherent in a block of high level language code. Additionally, pipeline parallelism is also available as thread level parallelism in the high level language code. In contrast, data parallelism is applicable in the low level op-code generated from the high level language code.

Planes of atomic execution units 402 are arranged in m rows and n columns as shown in FIGS. 3 and 4. The planes in turn are connected in a through global switch memory 308 to form a cuboid structure. The cuboid structure can be defined by unit vectors x, y and z. In one embodiment, all the execution resources are equally distributed within the cuboid structure. Each execution resource within the cuboid structure can then be represented as a node with three coordinates $r_i(i_k)(x,y,z)$, where k is again the type of execution unit. The interconnection between the execution units 402 in the planar matrix 306 is more fully set forth in U.S. application Ser. No. 13/783,209, which was previously incorporated by reference.

Figure 13:
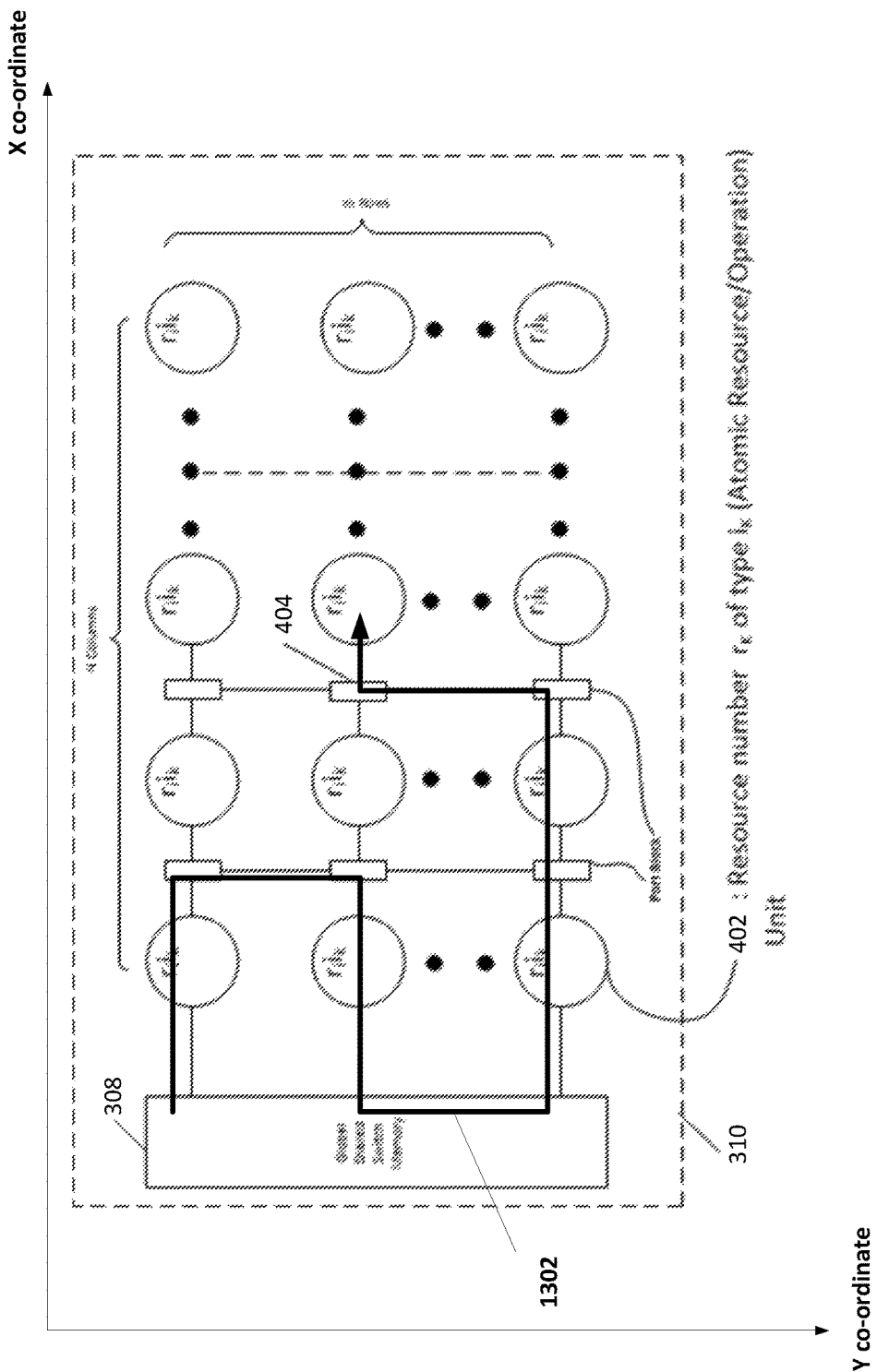
FIG. 13 is a block diagram illustrating an execution path in accordance with this disclosure.

To provide optimal performance, the scheduler needs to be aware of the cost of traversing through the matrix 306, such as the cost to traverse between resources 402 in a same row, different rows, and different rows and banks. An illustrative execution path is shown at 1302 in FIG. 13. The time to traverse the path 1302 can be determined by:

Total time=Time in global shared memory 308+Time in resource $r_i i_k(1,1,1)$+Time in port block register (1,1,1)+Time in port block register (1,2,1)+Time in resource $r_i i_k(1,2,1)$ Time in global shared memory 308+Time in resource $r_i i_k(1,m,1)$+Time in port block register (2,m,1)+Time in Resource $r_i i_k(2,m,1)$+Time in resource $r_i i_k(2,m,1)$+Time in port block register (3,m,1)+Time in port block register (2,2,1)+Time in resource $r_i i_k(3,2,1)$ Here, the number of memory elements or port blocks 404 that must be passed through for row traversal in the same planar matrix 306 is equal to the difference in the coordinates of the data originator and data acceptor atomic execution units 402, The planar matrix 306 allows reduction in memory access cycles to pre-fetch other data and instructions into the global switched cache 308, and effective interleaving of multiple accesses between resources 404 on different planes.

Plane to plane traversal is equivalent to a z-axis traversal between $r_i i_k(x,y,z1)$ and $r_i i_k(x,y,z2)$, where z1 and z2 are the z-coordinates which are positive integers. The interconnection between planes and port blocks of the matrix 306 can be implemented using different technologies, which are more fully set forth in U.S. application Ser. No. 13/783,209. When Through Silicon Vias ("TSV") is used to interconnect the planes, one or two ports of the port block registers 404 can be connected to other planes via the interconnect vias. In a different implementation, wires can be physically routed from one 2-dimensional matrix to another 2-dimensional matrix to emulate a 3-dimensional matrix structure. Similarly, where the process 302 comprises multiple dies, multi-chip modules can be arranged on the same substrate or in a single chip package interconnected using wires or traces.

The least expensive execution paths through the graph processor 302 are the ones that take the least amount of time. One advantage of the fine grained processor 302 is that the delay through the execution resources 402 is fixed. Accordingly, the number of clock cycles a resource 402, such as an adder or multiplier, takes to perform one operation can be controlled by the scheduler. This number of clock cycles is independent from the delay of traversing through the port block registers 404 and the global switched memory 308. Delaying control commands to forward data from the port block registers 404 allows for multiple execution paths (such as path 1302) to be simultaneously traversed through the graph processor 302. This concurrency allows for parallel execution of instructions based on a variety of parallelism techniques that can be exploited by the processor 302.

Figure 5:
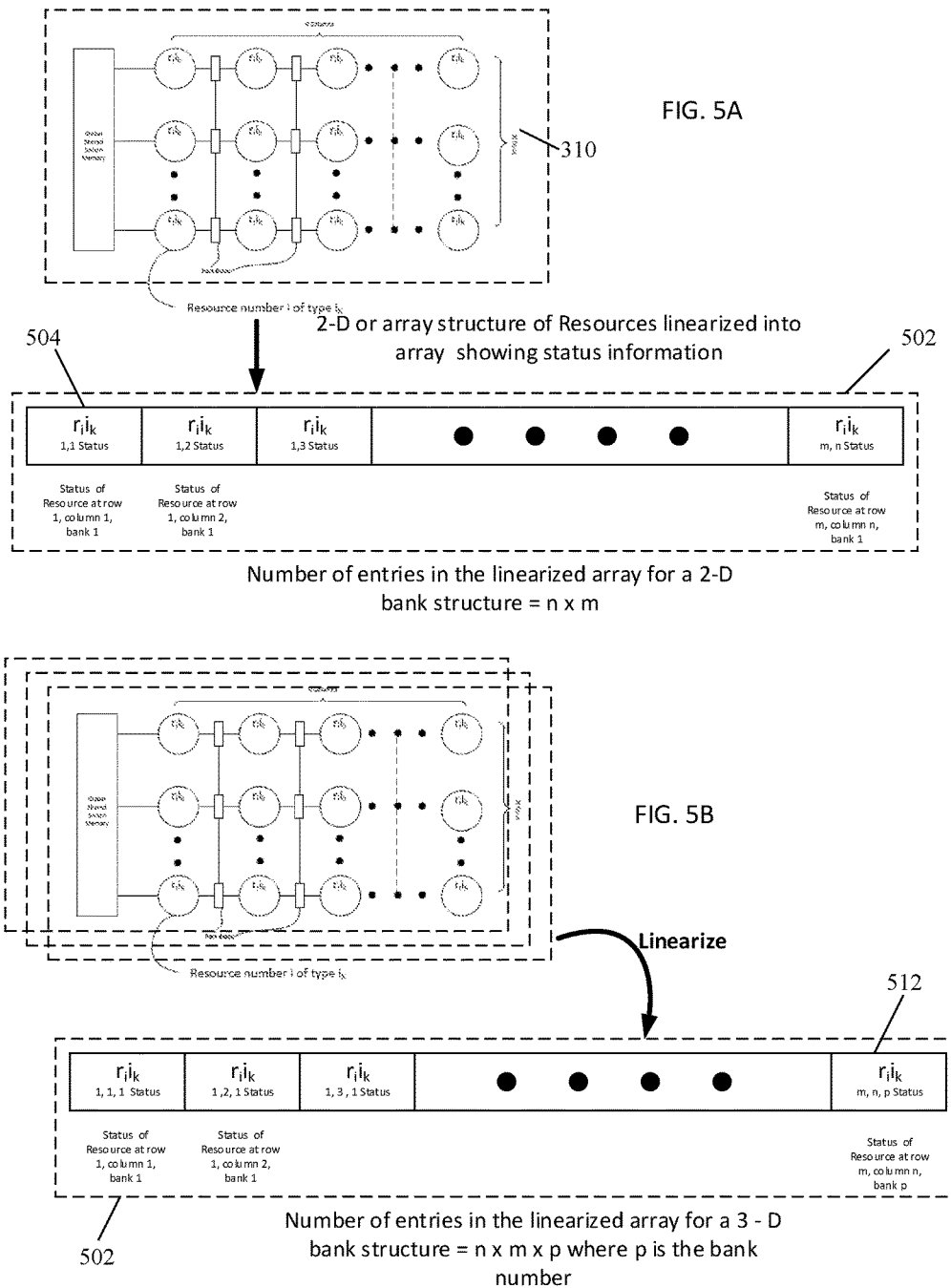
FIG. 5A is a block diagram depicting the architecture of a graph processor in accordance with this disclosure.
FIG. 5B is a block diagram depicting the architecture of a graph processor in accordance with this disclosure.

Before scheduling a task, the scheduler checks for availability of the least expensive paths for the execution of a particular instruction or set of instructions. To do so, the scheduler checks the statuses of the resources 402 and a resource scoreboard 502 as shown in FIG. 5A. The scoreboard 502 is further illustrated by reference to FIGS. 5B and 8. Additionally, the scoreboard 502 is more fully set forth in U.S. patent application Ser. No. 13/783,209. Turning now to FIG. 5A, the scoreboard 502 is a linearized representation of the matrix 306 of the graph processor 302. The score-board 502 contains entries of statuses for the entire matrix 306. Each entry 504 is a status register. The scoreboard entries for nodes in the first plane of the matrix 306 are indicated at 502. The scoreboard entries for nodes in all planes of the matrix 306 are indicated at 512 in FIG. 5B.

For a given type of operation (indicated by type k), the check of availability of resources 402 involves the lookup of $i_k$ entries in the scoreboard 502, and check of availability of these entries. In one hardware based implementation, the scoreboard 502 is stored in memory. In such a case, a simple logical "and" operation can be used to determine available resources of type $i_k$. For example, where a binary value of 0001 indicates availability of a type $i_k$ resource, an "and" operation between the board 502 and an array of 0001s will result in an array of available resources of type $i_k$.

The check for the availability of resources on each execution cycle can be done pre-emptively. During every scheduling cycle, this check is performed before scheduling the candidate operations. Thus an estimate of the total execution time for instructions in the current scheduled instructions in the current scheduling cycle is obtained in advance, and is available as the worst case execution time for any given instruction of any atomic operation in a resource. The estimate allows for a more efficient static or dynamic scheduling to happen as the number of resources in any given scheduling cycle is known ahead of time.

When a data flow or sequencing graph is statically scheduled, a lookup can be performed on the linearized array of resources 402 represented by the resource scoreboard 502. In the worst case, the number of lookups required in every clock cycle is m×n for a plane or m×n×p for 3-dimensional matrix 306. However, during each scheduling cycle, the number of lookups will decrease by the number operations already scheduled. The scheduler then generates a scoreboard 1102 as shown in FIG. 11A. The scoreboard 1102 includes entries 1104 as shown in FIG. 11B. The entries 1104 of the scoreboard 1102 indicate values of types K, and the entry numbers (indicated by $i_K$) each type K. Each entry 1104 also indicates the status, scheduling cycle, and co-ordinates of the corresponding resource 402 in the matrix 306. The combination of the time, scheduled operations (scheduled_ops) to be executed by resource, and resource type (resource_type) uniquely identifies each entry 1104. Updates to the scoreboard 1102 are made cycle by cycle, while the co-ordinates, resource type K, and resource number do not change between cycles. In one implementation, the scoreboard 1102 is implemented as a hardware structure in the system comprising the processor 302.

The number of entries in the graph processor scoreboard 1102 is going to be n×m×7, where 7 is the number of rows corresponding to attributes as shown in FIGS. 11A and 11B. The size of the graph processor scoreboard is going to be k entries for each of the k types of resources, with each k having $i_k$ sub entries for $i_k$ number of resources of each type k. So for a graph processor (306) where K=1 (an adder) and 10 adders in the system then $i_k$ has the values={1, 2, 3, 4, 5, 6, 7, 8, 9, 10}, will have 70 entries for the adder.

In the illustrative cuboid structure of the processor 302, as shown in FIGS. 4, 5A and 5B, the cost of traversing between two consecutive atomic execution units 402 in the same row is only one port block register 404. However, to traverse two consecutive atomic execution units 402 in two different rows, the cost is two port block registers 404. Where this traversal involves the memory 308, the cost would be three. To traverse two consecutive atomic execution units 402 in two different planes, the cost is two port block registers 404, or is two port block registers 404 and the memory 308. As used herein, consecutive atomic execution units are defined as two atomic execution units whose co-ordinates differ only by a value of one (1). For example, $r_i i_k(1,1,1)$ and $r_i i_k(2,1,1)$, $r_i i_k(1,1,1)$ and $r_i i_k(1,2,1)$, and $r_i i_k(1,1,1)$ and $r_i i_k(1,1,2)$ are three sets of consecutive atomic execution units.

Before scheduling any operation of a sequence of operations, the availability of all the execution paths and required resources 402 are checked. The checking is first performed on resources 402 in the same row of the same plane. If the first type of checking yields a negative result, checking on resources 402 in different rows, but in the same plane, is performed. If the second type of checking still yields a negative result, checking on resources in different planes is then performed. Generally, the scheduling algorithm prioritizes execution paths in the order shown below to reduce execution cost.

1) From one resource to another resource in the row;
2) From one resource to another resource in a different row in the same bank/plane; and
3) From one resource to another resource in a different bank/plane.

Instructions that are not scheduled in a previous clock cycle compete for resources 402 in the current clock cycle with the new instructions for executions from the same or different DFG or SG. To maintain proper sequencing between instructions and allow for out of order execution, the label parameter in the node structure is utilized. The label parameter is an implicit QoS parameter that determines the distance of any operation in a sequencing graph. The distance is the number of edges between a particular node and the NOP in the sequencing graph, which starts from a vertex node and ends with a terminating node or NOP. It is desirable to optimize the depth of the instruction queue associated with each atomic execution unit 402. The graph processor 302 implements multiple simultaneous pipelines of variable depth.

The scheduler can be implemented as a combination of hardware and software or purely in software. The queue of instructions that is created and associated with each resource 402 can be associated with an individual thread. In particular, the sequence of instructions associated with each compound instruction can be associated with a thread. The processor 302 is thus a thread based computer processor with natural hardware multi-threading capabilities. A hardware thread is a sequence of instructions. A process for executing a computer program can spawn multiple threads, such as hardware threads. A sequencing graph of instructions for each of the threads is generated for execution.

Figure 8:
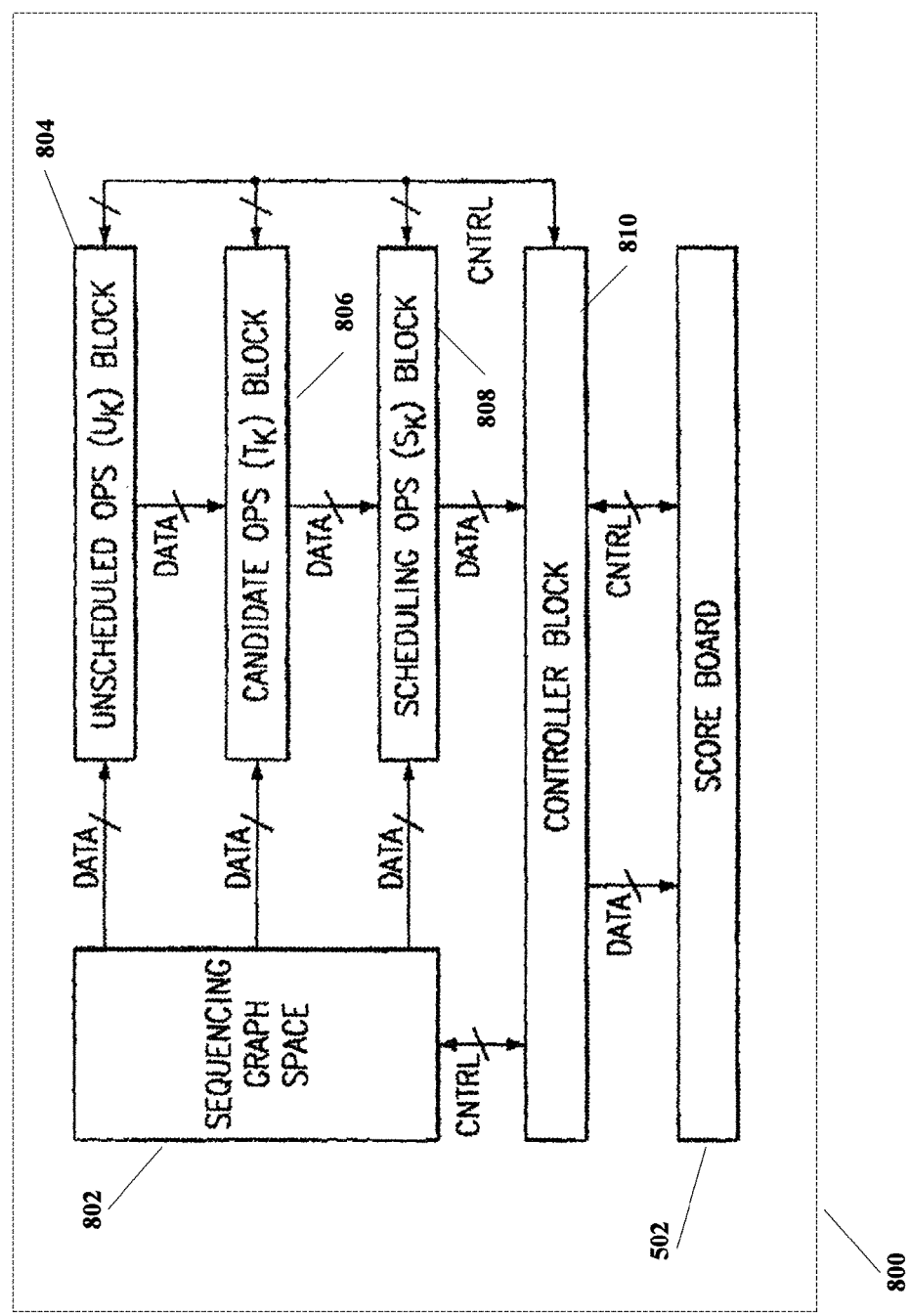
FIG. 8 is a functional block diagram of a scheduler in accordance with this disclosure.

The unscheduled sequencing graph or the data flow graph 614 (see FIG. 7) is fed to a scheduler 800 as illustrated by a block diagram in FIG. 8. The scheduler 800, implemented in hardware or software, has the following elements, without limitation to:

1. Sequencing graph space 802, which stores the unscheduled sequencing graph or the data flow graph 614 generated by the parser/generator 612;
2. Unscheduled ops block 804, after numbering all the vertices or nodes in the graph 614 with numbers as shown in FIG. 10, a set of unscheduled operations, that includes all the operators 714, the memory read, writes and moves 712 fall under this category;
3. Candidate ops block 806, which includes operations having the largest label or number associated with them. A larger value of the label corresponds to a higher priority of the operation to be executed. In an alternate embodiment, a smaller value of the label indicates a lower priority of the operation. In one implementation, the label is the distance of the operational node in a flow graph from the first (or last) NOP. Other methods determining QoS/constraint metrics can be used to determine the candidate operations from the total number of unscheduled ops stored in 804;

4. Scheduling ops block 808 that includes operations for which resources 402 required are available in the given cycle. A list of these operations is maintained either in the score board 502 in the memory associated or contained in the scheduling ops block, depending on whether the entire scheduler 800 is a hardware implementation or software implementation;
5. Controller block 810 that runs and controls the whole operation and runs the flow graph or algorithm associated with the scheduler; and
6. Graph processor scoreboard 502 which has a structure 1102 as shown in FIG. 11A.

In one embodiment, the scheduler 800 is implemented in hardware. In the hardware embodiment of the scheduler 800, the storage elements of the scheduler 800 are DRAM or SRAM registers, data structures are constructed in virtual memory in the software embodiment. Computational logic of the scheduler can be logic elements in the hardware embodiment and functions in the software embodiment. In the software embodiment, each of the modules in the scheduler 800 is associated with data structures for which memory is allocated in the system 302 or 304. Each of the data structures then has elements within it defined by different data types. The software embodiment can be implemented in a high level computer programming language, such as C or C++, as a high level software application. The software runs on a traditional processor such as an embedded ARM, NIOS or other processors and computers. The software embodiment is desirable for static scheduling.

The scheduler 800 generates a series of control commands for the interconnect muxes and de-muxes in the form of port blocks of the system to select or route the data that is fed into the machine. The series of control commands is then downloaded to the graph processor 302 for execution. For a full hardware implementation of the scheduler 800, a hard macro or a HDL can used. The data structures used for the sub-modules in the scheduler 800 are memory elements in hardware.

The size of the unscheduled ops block 804 is large enough to accommodate all the entries in the sequencing graph space ("SGS") block 802. After each successive scheduling round, the number of entries in the unscheduled ops block 804 is reduced by the number of successfully scheduled operations from the scheduling ops block 808. The flow graph for the algorithm of the scheduler is further illustrated by reference to shown in FIG. 9. The controller block 810 in the scheduler runs the flow graph. The flow graph of FIG. 9 is further illustrated in the pseudo-code below:

```
Schedule (G(V, E ) sequencing graph, R Resource Array)
Label ( G ( V, E));
Time_step=1;
  Repeat
  {
    For each resource type K where r_k(ik) belongs to R= {
            r1(i1),r2(i2), . . . r_k (i_k)}
      Determine all the candidate operations U_k (Score board entry for
            r_k(i_k));
      Determine unfinished operations T_k whose predecessors have been
            scheduled;
      Select S_k belongs to U_k( or operations), such that the label for
            elements s in S_k is maximal of all the operations
            in T_k and | S_k | ik (i_k is the number of resources of
            type k);
      Repeat until all resources i_k of type k are occupied (all of r_k (i_k) for
            a particular k)
      {
        For each element s in S_k
        {
```

-continued

```
          If s belongs to a compound instruction then
            Lookup N/n*(n−1) entries for the availability of rk(ik)(all
                  resources in the same row)
            If available then
            {
              Schedule s;
              Go to next element in S_k;
              Remove s from T_k
              Update U_k;
            }
            Else if(r_k(i_k) not available then
            {
              look up (N−m*n) entries for the availability of rk(ik) (all
                  resources in different planar matrices if(available) then
              {
                Schedule s;
                Go to next element in S_k;
                Remove s from T_k
                Update U_k;
              }
            Else if(r_k(i_k) not available ) then
            {
              look up (m*n−1) entries for the availability if r_k(i_k)
                  (all resources in the same planar matrix) else if
                  available then
              {
                Schedule s;
                Go to next element in S_k;
                Remove s from T_k
                Update U_k;
              }
            }
          Else ifs is a simple instruction
          {
            Lookup N*m*n entries if available then
            {
              Schedule s to the first available r_k(i_k)(any resource in
                  the entire 3-Dimensiaonal matrix);
              Go to next element in S_k;
              Remove s from T_k;
              Update U_k;
            }
          }
        }
      time=time+1;
      return U_k;(Score board for elements of type k)
    }
    Until the last operation in U_k has been scheduled ( i.e. U_k is
            empty)
}
```

$U_k$ - Unscheduled ops
$T_k$ - Candidate ops
$S_k$k - Scheduled ops
N - No of nodes
m - no of rows
n - no of columns In one hardware implementation of the scheduler, arrays Uk, Tk, and Sk are register files made of embedded SRAM or DRAM. The entries in each of the arrays are bit strings that represent the unscheduled operations, candidate operations and operations to be scheduled in the current system clock or cycle. The scheduled sequencing graph 1000 is modeled as a series of vertices (i.e. nodes). The resources in the graph processor 302 or 304 execute the instructions associated with the series of vertices.

Figure 12:
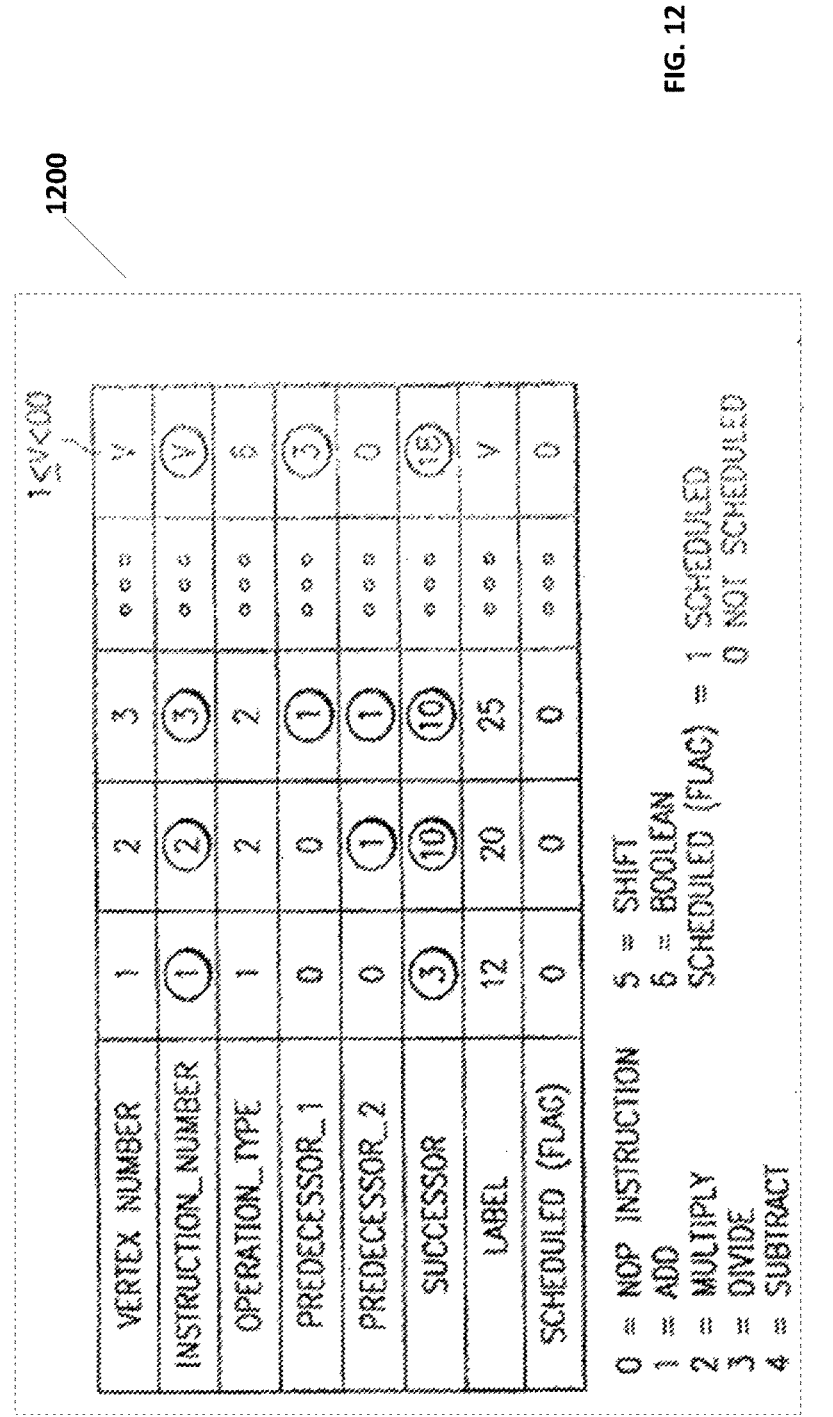
FIG. 12 is a vertex structure in accordance with this disclosure.

A sequencing graph includes vertexes or nodes. Each vertex includes an instruction number, operation type, predecessors, successors and label as shown in FIG. 12. Instruction number is identifies an instruction in the sequencing graph as shown in FIG. 10. Operation type is the associated type k of the underlying atomic execution. In one embodiment, each operation is an atomic operation and has one or more operands. Therefore, each instruction will have only two predecessors. There is one or more successors associated with each operation. Label is the weight or distance between the vertex and the NOP vertex of the unscheduled sequencing graph. Label measures the number of edges between the vertex associated with the current instruction and the vertex corresponding to the vertex that is associated with a NOP instruction.

The entire scheduler 800 can be implemented in software, where the constraints of the fine grained graph processor 302 are statically fed to the scheduler 800. The software embodiment of the parser/generator module 612 then generates the internal representation of the sequenced data flow graph 1200 as shown in FIG. 12. The form of the graph 1200 is compatible with the controller block 810 in the scheduler 800. All the elements of the scheduler 800 and the parser/generator 612 can be implemented in hardware or software, or run on an embedded processor to which the graph processor 302 functions a co-processor to the embedded processor. Without a loss of generality the scheduler 800 can be applied to multi-core processors or processors where each of the resources is of the same type with any form of interconnect, as long as the costs to traverse interconnect are applied properly in the scheduling algorithm. We look at a simple model of a fine grained machine to which, the operations are going to be scheduled.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A method for scheduling a task for a fine grained graph processor, the method operated by a scheduler in a fine grained graph processor based system and comprising:
   i. scheduling nodes of a same label field within a set of nodes of an unscheduled sequencing graph for execution by said fine grained graph processor within a same execution time slot to form a scheduled sequencing graph, wherein:
      (1) said fine grained graph processor includes a matrix of execution units interconnected by port blocks and a global switched memory, wherein said matrix includes planes of execution units and said planes are interconnected by said global switched memory, and wherein each execution unit of said matrix includes a broadcast switch element, a receive switch element, or a memory element;
      (2) said unscheduled sequencing graph is generated from a task coded in a computer programming language; and
      (3) said unscheduled sequencing graph includes said set of nodes indicating a set of instructions of said task, each node within said set of nodes including a label field that indicates a distance between nodes of said unscheduled sequencing graph; and
   ii. during each scheduling cycle, checking for availability of a least expensive execution path and required execution units for executing instructions of said scheduled sequencing graph within a corresponding execution time slot by determining a first status of execution units of said fine grained graph processor, and a second status of an execution unit scoreboard.

2. The method for scheduling a task of claim 1 further comprising scheduling nodes farthest from an end of said unscheduled sequencing graph first for execution by said fine grained graph processor.

3. The method for scheduling a task of claim 1 further comprising performing lookups of a linearized array of said execution units represented by said execution resource scoreboard to generate an execution scoreboard, said execution scoreboard including a set of execution scoreboard entries, each entry within said set of execution scoreboard entries including values of execution unit types, entry numbers of execution unit types, a status, a scheduling cycle, co-ordinates of corresponding execution units within said matrix, wherein said execution scoreboard is updated during each scheduling cycle.

4. The method for scheduling a task of claim 1 wherein said schedule checks for said availability of a least expensive execution path and required execution units by
   i. firstly checking execution units of a same row of a same plane within said matrix;
   ii. secondly checking execution units of different rows of a same plane within said matrix; and
   iii. thirdly checking execution units of different planes within said matrix.

5. The method for scheduling a task of claim 1 wherein said schedule includes:
   i. a sequencing graph space adapted to store said unscheduled sequencing graph;
   ii. an unscheduled ops block including unscheduled instructions;
   iii. a candidate ops block including unscheduled instructions that have a largest label field value;
   iv. a scheduling ops block including instructions for which required execution units are available in a given execution cycle; and
   v. controller block adapted to control operation of said scheduler.

6. The method for scheduling a task of claim 5 wherein said schedule is implemented as a computer software.

7. The method for scheduling a task of claim 5 wherein said schedule is implemented as a computer hardware.

8. The method for scheduling a task of claim 5 wherein said schedule is implemented as a combination of both computer hardware and computer software.

9. The method for scheduling a task of claim 1 further comprising generating said unscheduled sequencing graph by:
   vi. compiling said task into an op-code set;
   vii. replacing each register of said op-code set with a port block register or a location within said global switched memory of said fine grained graph processor; and viii. consolidating data load for said unscheduled sequencing graph.

10. The method for scheduling a task of claim 9 further comprising:
  i. profiling said task to generate instruction statistics; and
  ii. determining an amount of required resources of said fine grained graph processor for executing said task.

11. The method for scheduling a task of claim 10 further binding a global variable of said task to said global switched memory.

12. The method for scheduling a task of claim 10 further associating a local variable of said task with a port block of said find grained graph processor, wherein said local variable is intended to be left in place in an execution context.

* * * * *